Figure 1:
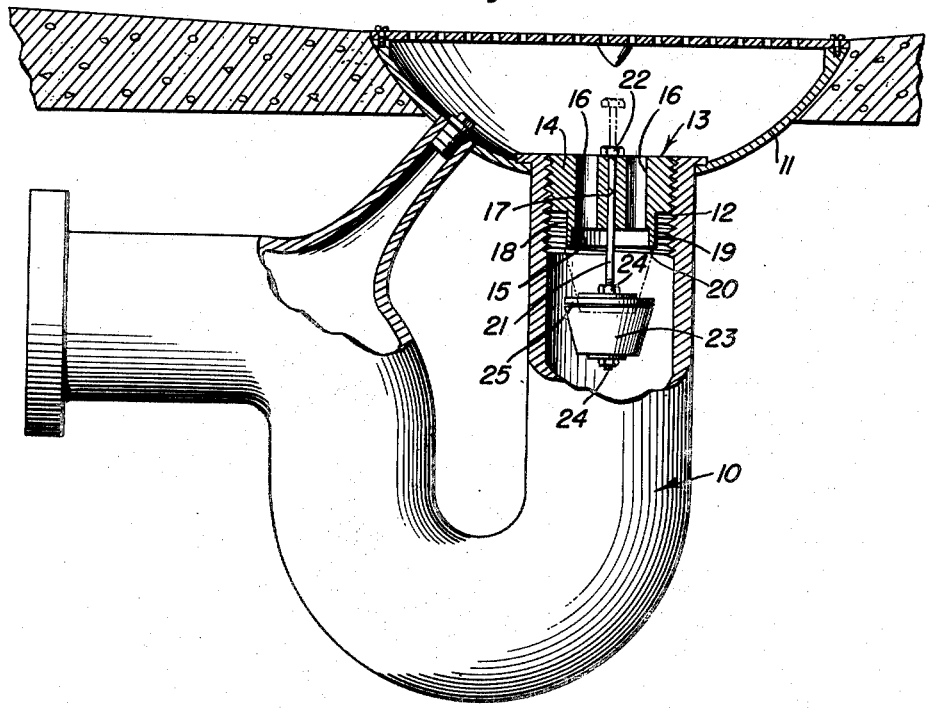

Nov. 28, 1950     E. BROCK     2,531,721

DRAIN ATTACHMENT

Filed Oct. 15, 1947

Inventor

Emrol Brock

By Clarence A. O'Brien
and Harvey B. Jacobson
Attorneys

Patented Nov. 28, 1950

2,531,721

UNITED STATES PATENT OFFICE 2,531,721

DRAIN ATTACHMENT

Emral Brock, Springfield, Mo.

Application October 15, 1947, Serial No. 779,937

1 Claim. (Cl. 137—104)

This invention relates to a drain attachment and has for its primary object to prevent water from backing upwardly through a drain trap and into an area to be drained.

Another object is to effectively seal the trap during flood periods, and automatically to permit the trap to assume its normal function when the period of emergency is over.

The above and other objects may be attained by employing this invention which embodies among its features an externally screw-threaded body adapted to be threaded into the upper end of a drain trap, said body having a concentric chamber opening outwardly through its lower end and an annular row of parallel drainage openings extending therethrough and communicating with the chamber, a float suspended from the body and movable longitudinally with relation thereto on the side adjacent the chamber, and a sealing cushion on the float for closing the open end of the chamber when the float is advanced toward the body.

Figure 2:
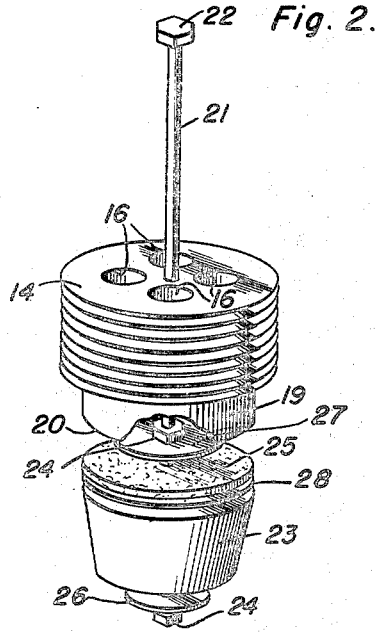
Figure 3:
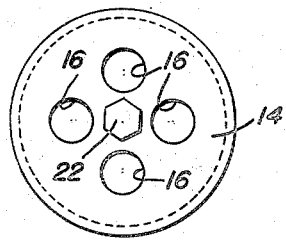

In the drawings:

Figure 1 is a side view of the trap partially in section illustrating this improved attachment in place therein, Figure 2 is a perspective view of the attachment showing certain portions broken away more clearly to illustrate certain details of construction, and Figure 3 is a top plan view of the drain attachment.

Referring to the drawings in detail, a drainage trap designated generally 10 is provided with a conventional drainage bowl 11 at its upper end and formed inside of the vertically extending leg of the trap 10 is a series of internal screw threads 12.

Threaded into the threaded end of the trap 10 is this improved attachment designated generally 13 which comprises an externally screw-threaded body 14 provided at its lower end with a concentric chamber 15 which opens downwardly at the lower end of the body as will be readily understood upon reference to Figure 1. Formed in the body in concentric relation about the axis thereof is an annular row of spaced parallel openings 16 which communicate at their lower ends with the chamber 15, and serve as the passages through which liquid contained in the bowl 11 is drained into the trap 10. In the preferred form of the invention, the body 14 is also formed with an axial opening 17, and the lower end of the body is reduced in diameter as at 18 to form a depending annular skirt 19 which surrounds the chamber 15 and forms at its lower end a valve seat 20.

Slidably mounted in the axial opening 17 is a suspension rod 21, the upper end of which is provided with a head 22 by means of which its downward movement through the passage 17 is limited. Supported on the suspension rod 21 adjacent its lower end is a float 23 of any conventional form, it being understood that the body of the float may be formed of cork or any other suitable light material, or that it may also be hollow, and formed of any suitable material such as sheet metal. In the preferred form of the invention, the float is clamped on the stem or suspension rod 21 between clamp nuts 24, and supported on the side of the float adjacent the body 14 is a sealing cushion 25 of rubber, synthetic resin, or fibrous material such as leather, which when the float is advanced toward the body 14 engages the seat 20 and prevents the flow of liquid into the chamber 15. Discs are coaxially mounted on said rod 21, the discs 26 and 27 being in engagement with opposite end faces of said float and cushion, respectively, and another of said discs, indicated at 28, being clamped between adjacent end faces of the float and cushion.

In use, the body 14 is threaded into the drainage receiving leg of the trap 10 as illustrated in Figure 1 so that the weight of the float 23 will maintain it in spaced relation to the body 14. Should liquid back up into the trap 10 it is obvious that the float 23 will be carried upwardly until the sealing cushion 25 engages the seat 20 and effectively closes the lower end of the chamber 15, thus preventing further rise of the liquid into the drainage bowl 11. In this way, flood waters backing up through a sewage system will be prevented from entering the drainage bowl 11 and the area drained thereby and at the same time when the flood waters subside, the float 23 will fall by gravity into the position illustrated in Figure 1, and the drainage system and trap will function in the ordinary way. By reason of the fact that the drain passages 16 all communicate with the chamber 15, it is evident that should the float become stuck in its elevated position a sufficient head of liquid will be created within the chamber 15 to cause the float and the cushion 15 to become unseated from the seat 20 automatically. In event that the head of liquid is not sufficient to disengage the cushion 25 from the seat 20, it is obvious that by removing the grill over the top of the drainage bowl 11 pressure may be applied directly on the head 22 to force the suspension rod 21 downwardly and by reason of the fact that the float and the sealing cushion are clamped between the nuts 24 it will be evident that the lower end of the chamber 15 may be forced open.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

A drain attachment comprising a circular cylindrical externally screw-threaded body adapted to be threaded into the upper end of a drain trap, an annular skirt of reduced diameter projecting longitudinally from one end of the body said skirt having an axial chamber opening through its end remote from the body, said body having an axial opening extending therethrough and opening into the chamber, said body also having an annular row of circumferentially spaced openings extending therethrough and communicating with the chamber, an elongated valve guide slidable through the axial opening and having a length greater than the combined length of said body and skirt, a head on the end of the guide remote from the chamber, an inverted frusto-conical float carried by the end of the guide opposite the head and a valve cushion on the end of the float adjacent the body for engaging the end of the skirt remote from the body and closing the open end of the chamber when the float is advanced toward the body, said float and cushion being separate and coaxial, coaxial centrally apertured disks on said guide, said guide having a threaded portion, and threaded elements on said threaded portion holding two of said disks in engagement with opposite end faces of said float and cushion, another of said disks being clamped between adjacent end faces of the float and cushion and reinforcing the float and cushion against breakage, the disk on the side of the cushion adjacent the skirt having a diameter less than the internal diameter of the skirt.

EMRAL BROCK.

REFERENCES CITED

The following references are of record in the file of this patent:

UNITED STATES PATENTS

| Number | Name | Date |
|---|---|---|
| 701,428 | Walsh | June 3, 1902 |
| 844,003 | Conrad | Feb. 12, 1907 |
| 1,576,331 | Kelley | Mar. 9, 1926 |
| 2,049,909 | Kirschner | Aug. 4, 1936 |